(12) United States Patent
Hosseini et al.

(10) Patent No.: US 11,729,786 B2
(45) Date of Patent: Aug. 15, 2023

(54) PHYSICAL DOWNLINK CONTROL CHANNEL FOR LOW COMPLEXITY OPERATION

(71) Applicant: QUALCOMM Incorporated, San Diego, CA (US)

(72) Inventors: Seyedkianoush Hosseini, San Diego, CA (US); Huilin Xu, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 17/248,043

(22) Filed: Jan. 6, 2021

(65) Prior Publication Data

US 2021/0212041 A1    Jul. 8, 2021

Related U.S. Application Data

(60) Provisional application No. 62/958,246, filed on Jan. 7, 2020.

(51) Int. Cl.
*H04W 72/23* (2023.01)
*H04W 72/51* (2023.01)

(52) U.S. Cl.
CPC ......... *H04W 72/23* (2023.01); *H04W 72/51* (2023.01)

(58) Field of Classification Search
CPC .............. H04W 72/048; H04W 72/042; H04L 5/0091; H04L 5/0053; H04L 5/0025
See application file for complete search history.

(56) References Cited

U.S. PATENT DOCUMENTS

| | | | |
|---|---|---|---|
| 2020/0169991 A1* | 5/2020 | Lin | H04W 72/10 |
| 2020/0351681 A1* | 11/2020 | Salah | H04L 5/0007 |
| 2021/0153228 A1* | 5/2021 | Shi | H04W 72/042 |
| 2021/0195450 A1* | 6/2021 | Lindoff | H04W 8/245 |
| 2022/0201691 A1* | 6/2022 | Shi | H04W 72/0493 |
| 2022/0225329 A1* | 7/2022 | Xu | H04L 5/0053 |
| 2022/0225393 A1* | 7/2022 | Gao | H04L 5/0053 |

OTHER PUBLICATIONS

International Search Report and Written Opinion—PCT/US2021/070011—ISA/EPO—dated Apr. 19, 2021.

(Continued)

*Primary Examiner* — Chi Ho A Lee
(74) *Attorney, Agent, or Firm* — Harrity & Harrity, LLP

(57) ABSTRACT

Various aspects of the present disclosure generally relate to wireless communication. In some aspects, a user equipment (UE) may identify a span configuration conflict between two or more span configurations associated with a span pattern for a carrier, wherein the two or more span configurations are associated with respective per-span capabilities for at least one of a quantity of non-overlapped control channel elements (CCEs) or a quantity of blind decodes to be performed for the carrier; select a span configuration or a per-span capability from the two or more span configurations to be used for the span pattern; and receive a communication on the carrier in accordance with the selected span configuration or the selected per-span capability. Numerous other aspects are provided.

30 Claims, 5 Drawing Sheets

(56) References Cited

OTHER PUBLICATIONS

Mediatek Inc: "PDCCH Enhancements for eURLLC", 3GPP Draft, 3GPP TSG RAN WG1 Meeting #98b, R1-1911078, PDCCH Enhancements for eURLLC, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019 (Oct. 8, 2019), XP051789857, 17 Pages, Retrieved from the Internet: URL: http://www.3gpp.org/ftp/tsg_ran/WG1_RL1/TSGR1_98b/Docs/R1-1911078.zip. [retrieved on Oct. 8, 2019] p. 9.

ZTE: "On PDCCH Enhancements for NR URLLC", 3GPP Draft, 3GPP TSG RAN WG1 #99, R1-1911963, 3rd Generation Partnership Project (3GPP), Mobile Competence Centre, 650, Route Des Lucioles, F-06921 Sophia-Antipolis Cedex, France, vol. RAN WG1. No. Reno. USA, Nov. 18, 2019-Nov. 22, 2019, Nov. 9, 2019 (Nov. 9, 2019), XP051823144, 15 Pages, Retrieved from the Internet: URL: https://ftp.3gpp.org/tsg_ran/WG1_RL1/TSGR1_99/Docs/R1-1911963.zip. R1-1911963 on PDCCH enhancements for NR URLLC.docx [retrieved on Nov. 9, 2019] p. 8.

\* cited by examiner

PHYSICAL DOWNLINK CONTROL CHANNEL FOR LOW COMPLEXITY OPERATION

CROSS-REFERENCE TO RELATED APPLICATION

This Patent Applications claims priority to U.S. Provisional Patent Application No. 62/958,246, filed on Jan. 7, 2020, entitled "PHYSICAL DOWNLINK CONTROL CHANNEL FOR LOW COMPLEXITY OPERATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a physical downlink control channel (PDCCH) for low complexity operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying a span configuration conflict between two or more span configurations associated with a span pattern for a carrier, wherein the two or more span configurations are associated with respective per-span capabilities for at least one of a quantity of non-overlapped control channel elements (CCEs) or a quantity of blind decodes to be performed for the carrier; selecting a span configuration or a per-span capability from the two or more span configurations to be used for the span pattern; and receiving a communication on the carrier in accordance with the selected span configuration or the selected per-span capability.

In some aspects, a UE for wireless communication may include memory and one or more processors operatively coupled to the memory. The memory and the one or more processors may be configured to identify a span configuration conflict between two or more span configurations associated with a span pattern for a carrier, wherein the two or more span configurations are associated with respective per-span capabilities for at least one of a quantity of non-overlapped CCEs or a quantity of blind decodes to be performed for the carrier; select a span configuration or a per-span capability from the two or more span configurations to be used for the span pattern; and receive a communication on the carrier in accordance with the selected span configuration or the selected per-span capability.

In some aspects, a non-transitory computer-readable medium may store one or more instructions for wireless communication. The one or more instructions, when executed by one or more processors of a UE, may cause the one or more processors to: identify a span configuration conflict between two or more span configurations associated with a span pattern for a carrier, wherein the two or more span configurations are associated with respective per-span capabilities for at least one of a quantity of non-overlapped CCEs or a quantity of blind decodes to be performed for the carrier; select a span configuration or a per-span capability from the two or more span configurations to be used for the span pattern; and receive a communication on the carrier in accordance with the selected span configuration or the selected per-span capability.

In some aspects, an apparatus for wireless communication may include means for identifying a span configuration conflict between two or more span configurations associated with a span pattern for a carrier, wherein the two or more span configurations are associated with respective per-span capabilities for at least one of a quantity of non-overlapped CCEs or a quantity of blind decodes to be performed for the carrier; means for selecting a span configuration or a per-span capability from the two or more span configurations to be used for the span pattern; and means for receiving a communication on the carrier in accordance with the selected span configuration or the selected per-span capability.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
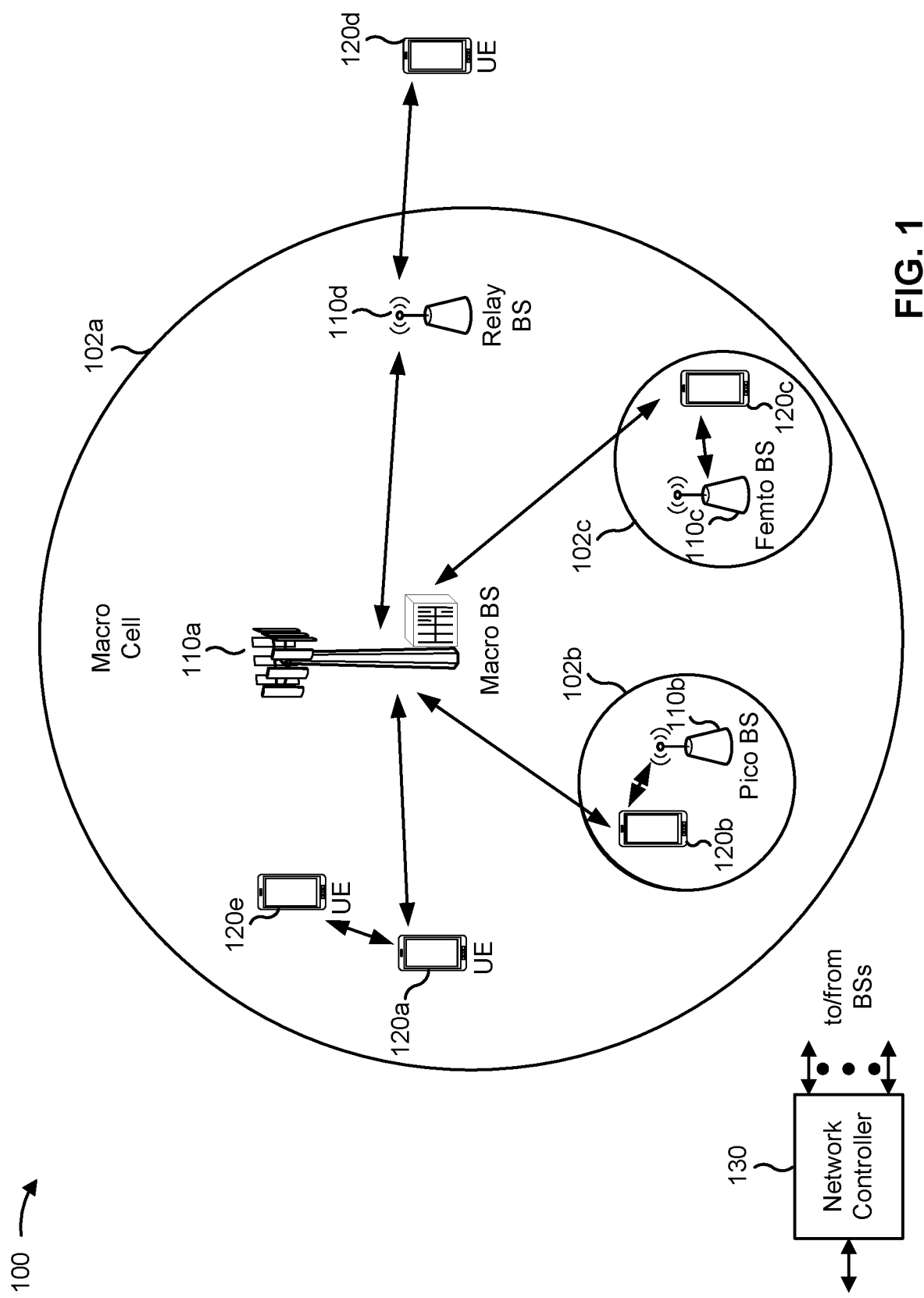
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
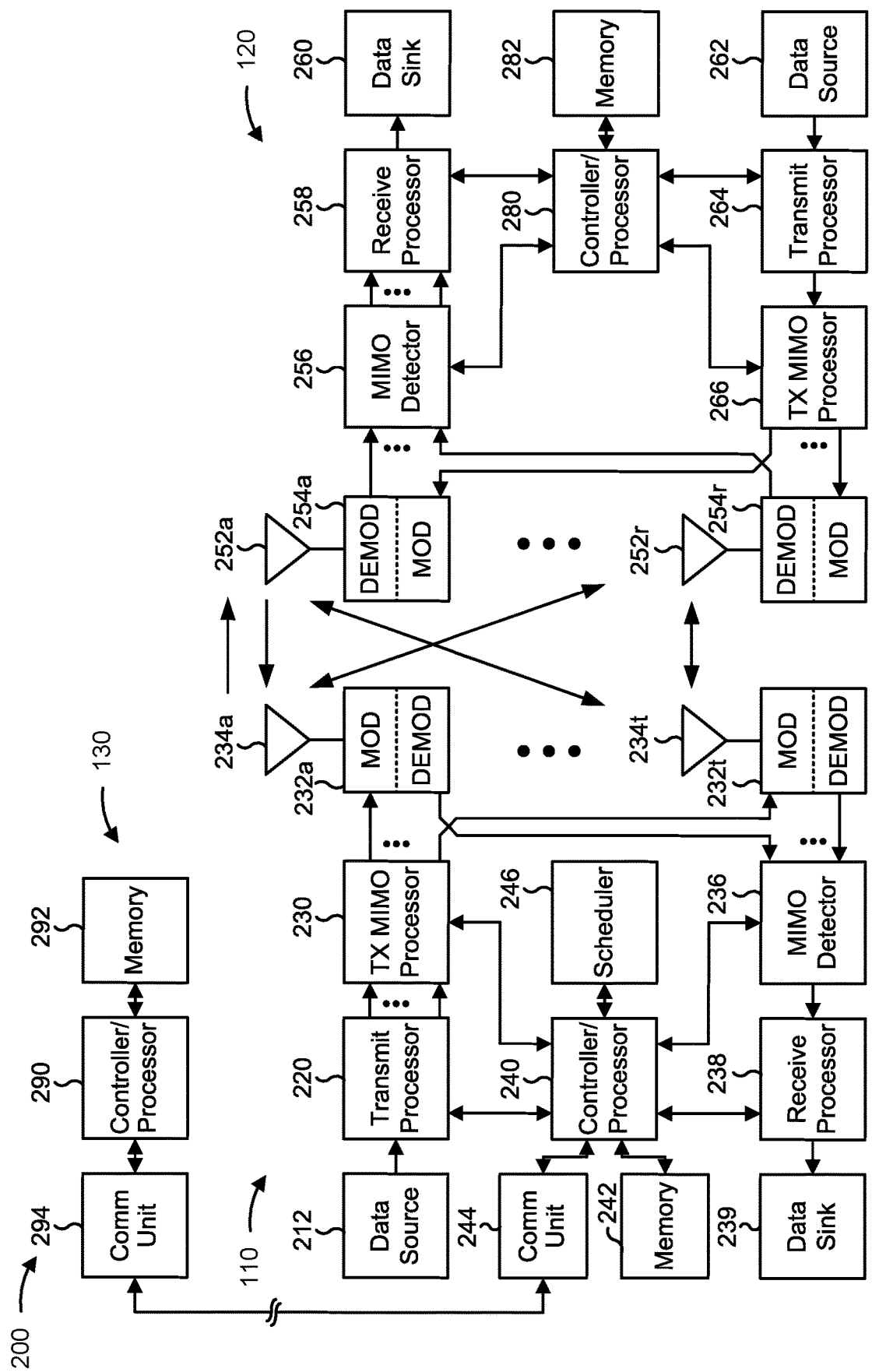
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate)

the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a PDCCH for low complexity operation, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5 and/or other processes as described herein. A scheduler 246 may schedule UEs for data transmission on the downlink and/or uplink.

In some aspects, UE 120 may include means for identifying a span configuration conflict between two or more span configurations associated with a span pattern for a carrier, wherein the two or more span configurations are associated with respective per-span capabilities for at least one of a quantity of non-overlapped control channel elements (CCEs) or a quantity of blind decodes to be performed for the carrier; means for selecting a span configuration or a per-span capability from the two or more span configurations to be used for the span pattern; means for receiving a communication on the carrier in accordance with the selected span configuration or the selected per-span capability; means for receiving information indicating a rule for selecting the span configuration or the per-span capability, wherein selecting the span configuration is based at least in part on the rule; means for providing an indication of a capability for selecting the selected span configuration or the selected per-span capability; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some radio access technologies (RATs), two sets of scheduling downlink control information (DCI) formats are supported: a fallback DCI (e.g., DCI formats 1-0 and 0-0 in 5G/NR) for downlink (DL) and/or uplink (UL) scheduling, and a non-fallback DCI (e.g., DCI formats 1-1 and 0-1 in 5G/NR) for DL/UL scheduling. In some deployments, such as an enhanced ultra-reliable low latency communication (eURLLC) supporting deployment, two additional DCI formats may be used: a DCI format 2-0 for UL scheduling and a DCI format 2-1 for DL scheduling. The two additional DCI formats may have flexible sizes, meaning that the bitwidth of many fields of the two additional DCI formats is configurable. Therefore, these two additional DCI formats can be configured with a small size to improve physical downlink control channel (PDCCH) reliability or with a larger size to improve scheduling flexibility and/or provide more functionality. The choice between these two approaches (e.g., small size or larger size) can be made by the scheduler.

In some RATs, such as 3GPP Release 15 of 5G/NR, different PDCCH monitoring capabilities are defined. As an example, a feature group (FG) 3-1 (which may be mandatory for Release 15 UEs to support) may indicate that the UE is capable of monitoring all PDCCH candidates for scheduling data that are within the first few symbols of a slot. As another example, an FG 3-5b (which may be optional for Release 15 UEs to support) may be defined based at least in part on a span concept. A slot can include multiple spans, and a span can include one or more PDCCH candidates. Different span configurations may be supported. Span configurations are described in more detail in connection with FIG. 3.

In a 5G/NR network, a base station transmits a PDCCH (e.g., including control information, such as DCI) based at least in part on a search space set. A given search space set defines candidates that may carry a PDCCH within the search space set, where each candidate is associated with one or more control channel elements (CCEs). A CCE may be composed of multiple resource element groups (REGs). A REG may include one resource block and one OFDM symbol. One or more search space sets may be associated with a control resource set (CORESET). In a 5G/NR network, a base station may flexibly schedule and transmit the PDCCH. In other words, transmission of the PDCCH in the 5G/NR network is not limited to a particular set of frequency resources and/or time resources in a given radio frame, as in the case of, for example, a LTE network. PDCCH frequency domain and time domain resources are configured on a per CORESET basis. Thus, once a UE is configured with a CORESET, the UE has information that identifies which resource blocks in the frequency domain are assigned to a search space set associated with the CORESET, as well as information that identifies a number of consecutive symbols occupied by the search space set.

In order to receive a PDCCH associated with one or more candidates of a given UE-specific search space set (i.e., a search space set that may carry control information specific to one or more particular UEs), a UE may attempt to decode a PDCCH in candidates of the search space set. For example, the UE may determine one or more CCE indices associated with a candidate, and may attempt to decode the PDCCH (e.g., using a blind decoding procedure). In some cases (e.g., 3GPP Release 15 of 5G/NR), limits on the number of non-overlapping CCEs and blind decodes (BDs) are defined on a per-slot basis. Thus, a large number of CCEs/BDs (in the extreme case, all of them) may be configured within one span. This significantly increases the UE complexity, particularly when attempting to conform to processing timelines that are suitable for supporting ultra-reliable low latency communication (URLLC) applications. On the other hand, if the scheduler chooses to distribute the CCEs/BDs across different spans, the number of CCE/BDs per span may not be sufficient. For example, for a subcarrier spacing (SCS) of 30 kilohertz (kHz) and a span capability of (X,Y)=(2,2), each span can have 8 CCEs. Hence, only one candidate of aggregation level=8 can be supported. Span capabilities are described in more detail in connection with FIG. 3.

To address the above issues, 3GPP Release 16 of 5G/NR introduces a PDCCH monitoring capability that is based at least in part on a span configuration of the UE. To improve scheduling flexibility, the number of non-overlapping CCEs and BDs per slot are increased as compared to 3GPP Release 15 of 5G/NR. Furthermore, to relax the UE complexity, a per-span CCE/BD limit (also referred to as a per-span capability) may be specified. This PDCCH monitoring capability may be referred to herein as a span-based monitoring capability or a Release 16 monitoring capability, whereas the PDCCH monitoring capability defined on a per-slot basis may be referred to as a slot-based monitoring capability or a Release 15 monitoring capability.

In some standards, if a UE reports the support of more than one span configuration for a given SCS, and if multiple span configurations are valid for a span pattern on a carrier associated with the given SCS (referred to as a span configuration conflict), the largest span configuration of the valid span configurations may be used to determine CCE or BD limits for the carrier. A span configuration is considered valid for a span pattern if the span pattern satisfies the span configuration in every slot, including at cross-slot boundaries. However, assuming a largest span configuration may increase complexity and blind decode count, thereby leading to increased power consumption and computing resource usage. This may be particularly problematic for lower-tier UEs, such as NR-light UEs, reduced capability (RedCap) UEs, Internet of Things UEs, and/or the like.

Some techniques and apparatuses described herein provide for signaling or selection of a span configuration to be used in the event of a span configuration conflict. For example, the UE may determine a CCE or BD limit per span based at least in part on a smallest span configuration, and/or may signal that the UE supports such a determination. Some techniques and apparatuses described herein provide an indication of a UE's capabilities (e.g., smallest span configuration in terms of CCE/BD limits per span, largest span configuration in terms of CCE/BD limits per span, and/or the like). In some aspects, a BS may configure a UE to use a particular rule (e.g., smallest span configuration in terms of CCE/BD limits per span, largest span configuration in terms of CCE/BD limits per span, and/or the like), to use a particular span configuration, and/or the like. In this way, complexity and number of blind decodes are reduced, thereby reducing complexity and conserving power and computing resources.

Figure 3:
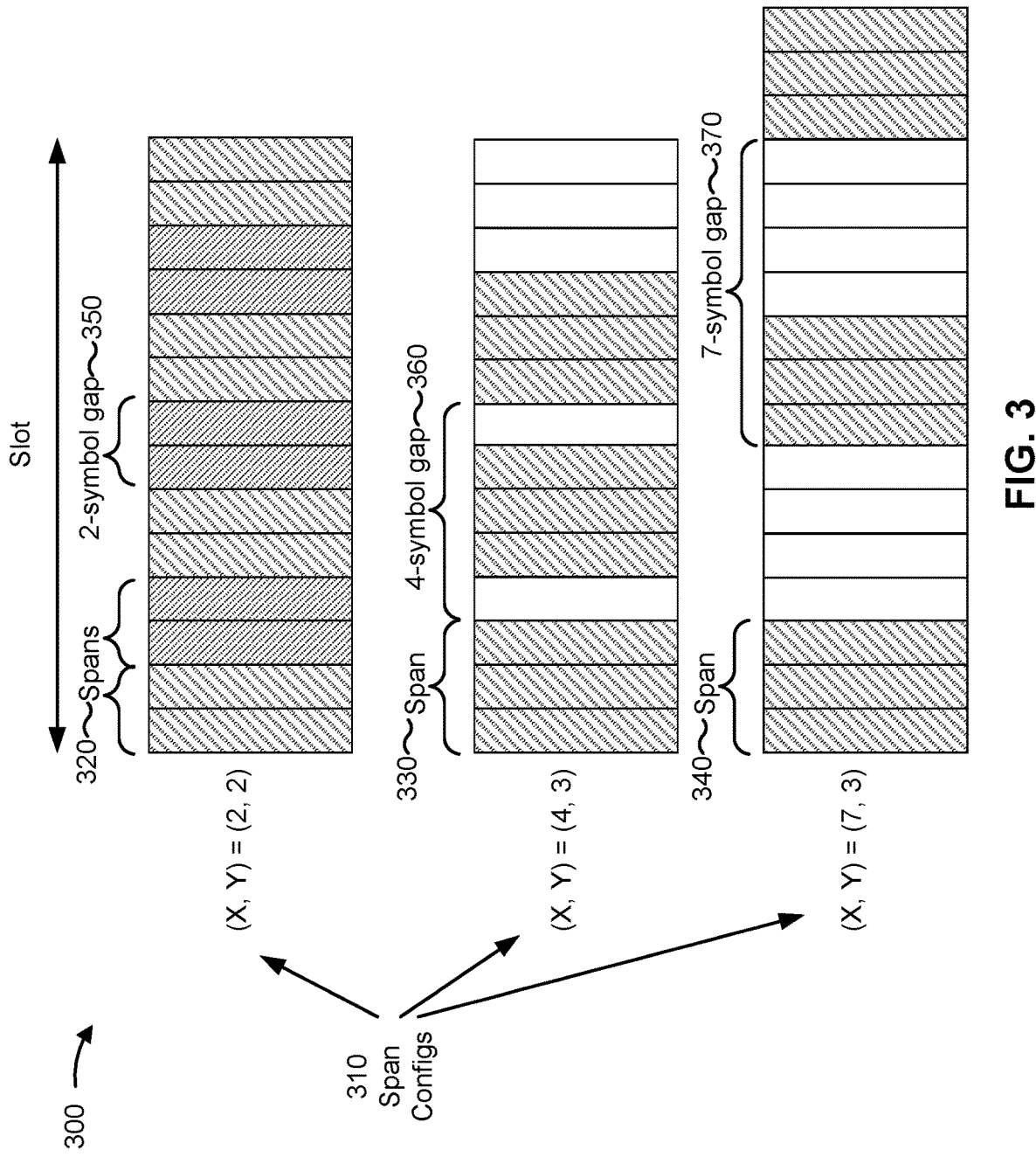
FIG. 3 is a diagram illustrating an example of spans in a slot for physical downlink control channel monitoring, in accordance with various aspects of the present disclosure.

FIG. 3 is a diagram illustrating an example 300 of spans in a slot for physical downlink control channel monitoring, in accordance with various aspects of the present disclosure. FIG. 3 shows a set of slots that are associated with respective span configurations, shown by reference number 310. A span configuration may identify a minimum gap X between the starting symbol of two spans and a maximum span duration Y.

The spans corresponding to span configurations (2, 2), (4, 3), and (7, 3) are shown by reference numbers 320, 330, and 340, respectively. The spans shown by reference number 320 are shown using alternating diagonal hatching, since these spans are adjacent to each other and would be difficult to differentiate otherwise. The spans shown by reference numbers 330 and 340 are separated by symbols that are not included in a span, which are shown by white rectangles.

The minimum gap X is shown for span configurations (2, 2), (4, 3), and (7, 3) by reference numbers 350, 360, and 370, respectively. It should be noted that X defines a minimum gap, so starting symbols of a pair of spans associated with span configuration (2, 2) may be two or more symbols apart from each other. Furthermore, the maximum span duration Y defines a maximum span duration, so the span 330 may have one-symbol or two-symbol spans while still being within the definition of the span configuration (4, 3).

A span configuration may be associated with a per-span capability for a number of BDs and/or a number of non-overlapped CCEs in a span. A per-span capability for a number of BDs may identify a maximum number of BDs that can be configured in a span 320/330/340, and a per-span capability for a number of non-overlapped CCEs may identify a maximum number of non-overlapped CCEs that can be configured in a span 320/330/340. These per-span capabilities may also be referred to as a BD limit and a CCE limit, respectively.

A UE may report a capability regarding one or more span configurations supported by the UE. For example, the UE may report that the UE supports one or more of span configurations (2, 2), (4, 3), and (7, 3). The UE may determine which span configuration is to be used for a communication based at least in part on a search space configuration. For example, a search space configuration may indicate search space candidates, and the UE may identify a span configuration that aligns with the search space candidates. In the case that the search space configuration aligns with two or more span configurations, the UE may assume that a largest CCE limit and/or a BD limit of CCE limits and/or BD limits corresponding to the two or more span configurations. However, this may increase complexity and consume computing resources. Techniques and apparatuses described herein provide for a UE to use a smallest span configuration (or a CCE limit and/or a BD limit corresponding to the smallest span configuration), or to signal a capability regarding the span configuration, thereby reducing complexity and conserving computing resources.

As indicated above, FIG. 3 is provided as an example. Other examples may differ from what is described with respect to FIG. 3.

Figure 4:
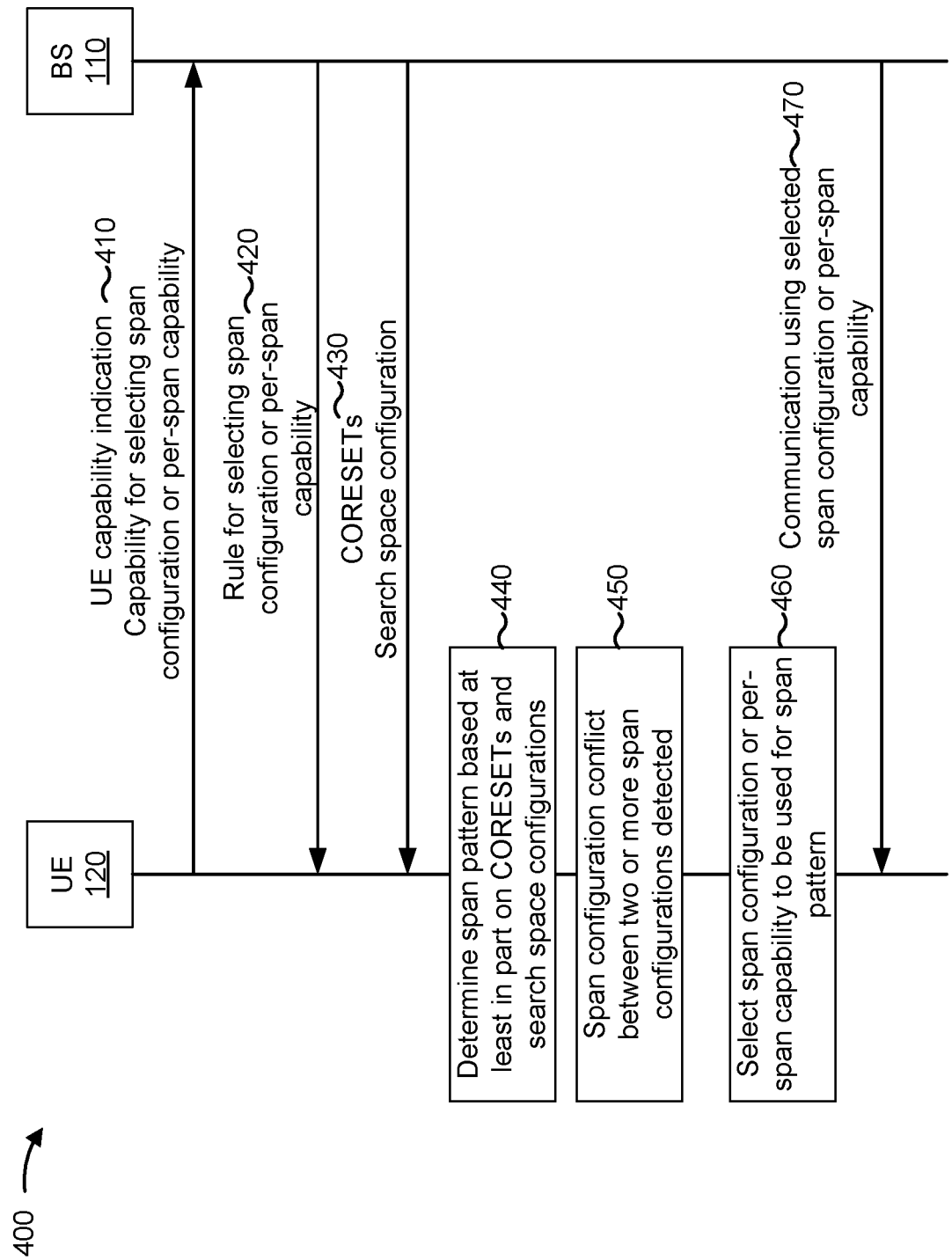
FIG. 4 is a diagram illustrating an example of resolving a span configuration conflict, in accordance with various aspects of the present disclosure.

FIG. 4 is a diagram illustrating an example 400 of resolving a span configuration conflict, in accordance with various aspects of the present disclosure. As shown, example 400 includes a UE 120 and a BS 110.

As shown by reference number 410, the UE 120 may provide an indication of a capability of the UE 120 to the BS 110. The indication may indicate one or more rules for selecting span configurations or per-span capabilities that are supported by the UE 120. For example, in some aspects, the indication may indicate that the UE 120 supports selecting a smallest span configuration or a smallest per-span capability to resolve a span configuration conflict. In some aspects, the indication may indicate that the UE 120 supports selecting a largest span configuration or a largest per-span capability to resolve a span configuration conflict. In these cases, the UE 120 may select the span configuration or the per-span capability in accordance with the capability signaled by the UE 120. It should be noted that selecting a per-span capability can refer to selecting a BD limit and/or selecting a CCE limit. In some aspects, the UE 120 may not signal the capability, which may conserve radio interface resources of the UE 120 and/or the BS 110, whereas signaling the capability may enable the BS 110 to determine whether to use a largest span configuration or a smallest span configuration, thereby conserving computing resources of the BS 110.

As shown by reference number 420, the BS 110 may provide information indicating a rule for selecting a span configuration or a per-span capability. For example, the rule may indicate to use a smallest span configuration or per-span capability (e.g., in terms of CCE/BD limits per span), a largest span configuration or per-span capability (e.g., in terms of CCE/BD limits per span), and/or the like. For example, the rule may include a direct indication the resolution of the conflict, or may indicate how the UE 120 is to resolve the conflict. In some aspects, the BS 110 may provide information indicating a particular span configuration to be used to resolve a span configuration conflict. For example, the BS 110 may indicate a particular (X,Y) value to be used to resolve the span configuration conflict. In some aspects, this information may be provided with the information identifying the one or more control resource sets and/or the one or more search space configurations. In some aspects, this information may be provided separately from the information identifying the one or more control resource sets and/or the one or more search space configurations. In some aspects, the BS 110 may not provide information indicating a rule for selecting a span configuration or a per-span capability. For example, the UE 120 may determine the rule without receiving such an indication, thereby conserving radio interface and computing resources of the BS 110.

As used herein, a span configuration conflict is a configuration for which multiple span configurations are valid for a span pattern on a carrier associated with the given SCS. For example, referring to FIG. 3, assume that each of the 3 spans of the (4,3) span configuration has 2 symbols only (instead of 3). Then, if the UE 120 supports (2,2) and (4,3) span configurations, a configuration of a PDCCH similar to the (4,3) span configuration (but with 2 symbols per span) would result into a span configuration conflict as such a configuration is aligned with both the (2,2) and the (4,3) span configuration.

In some aspects, the indication transmitted to the UE 120 may be transmitted using semi-static signaling or may be semi-static. For example, the indication may be transmitted via radio resource control (RRC) signaling and/or the like. In some aspects, the indication may be transmitted using dynamic signaling or may be dynamic. This may enable adaptation of the indication to traffic conditions. For example, after configuration of the control resource sets (CORESETs) and/or search spaces, as described in connection with reference number 430, the UE 120 may assume per-span capabilities based at least in part on the largest span configuration of the supported span configurations pairs or based at least in part on the values associated with a span configuration indicated to the UE 120 by RRC signaling. Then, the indication may be adapted or modified (e.g., using a medium access control (MAC) control element (CE), downlink control information (DCI), or another form of signaling) with different action times, thereby informing the UE 120 of one or more points at which the modified span configuration or per-span capabilities is to be implemented.

As shown by reference number 430, the BS 110 may provide information identifying one or more CORESETs and/or one or more search space configurations to the UE 120. As shown by reference number 440, the UE 120 may determine a span pattern based at least in part on the CORESETs and the search space configurations. For example, the UE 120 may identify a span pattern based at least in part on locations of PDCCH candidates in a slot.

As shown by reference number 450, the UE 120 may identify a span configuration conflict between two or more span configurations. For example, the UE 120 may determine that two or more span configurations are valid for the span pattern derived by the UE 120 based at least in part on the CORESETs and search space configurations. As shown by reference number 460, the UE 120 may select a span configuration and/or a corresponding per-span capability (e.g., a per-span CCE limit or capability and/or a per-span BD limit or capability) based at least in part on identifying the span configuration conflict between the two or more span configurations. For example, the UE 120 may select the span configuration and/or the per-span capability in accordance with the capability indicated by the UE 120, the rule indicated by the BS 110, and/or the like. In some aspects, the UE 120 may select the span configuration and/or the per-span capability based at least in part on a UE type of the UE 120. For example, the UE 120 may select a largest span configuration or per-span capability if the UE 120 is a high-tier UE, and may select a smallest span configuration or per-span capability if the UE 120 is a low-power UE or a low-tier UE. In some aspects, the UE 120 may select the span configuration, and may use a per-span capability corresponding to the selected span configuration. In some aspects, the UE 120 may select the per-span capability independently from the span configuration. As shown by reference number 470, the UE 120 may communicate using the selected span configuration or the selected per-span capability. In this way, the UE 120 may resolve an ambiguity in which span configuration is to be used for a span pattern, which may provide the UE 120 with the flexibility to use a smallest span configuration or per-span capability, thereby improving utilization of computing resources and reducing complexity.

As indicated above, FIG. 4 is provided as an example. Other examples may differ from what is provided with regard to FIG. 4.

Figure 5:
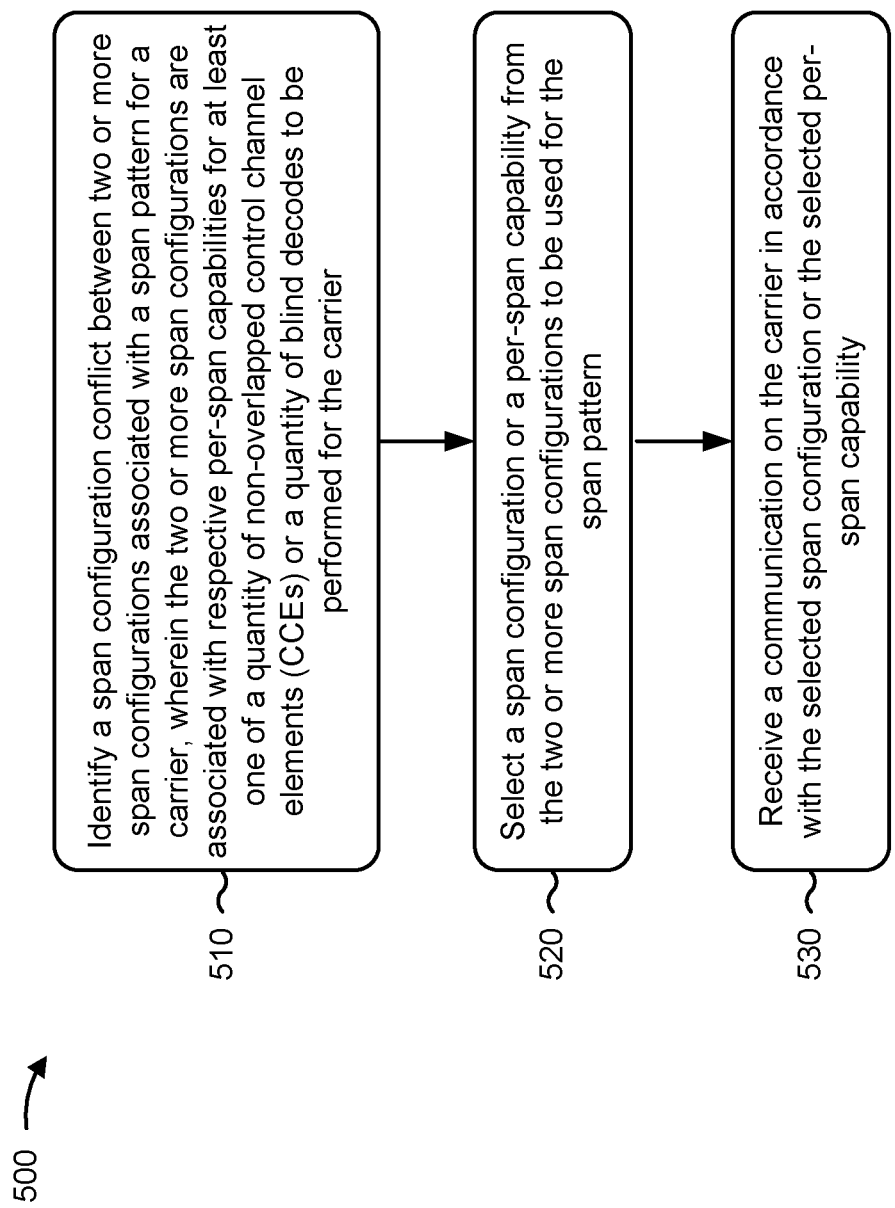
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with physical downlink control channel for low complexity operation.

As shown in FIG. 5, in some aspects, process 500 may include identifying a span configuration conflict between two or more span configurations associated with a span pattern for a carrier, wherein the two or more span configurations are associated with respective per-span capabilities for at least one of a quantity of non-overlapped control channel elements (CCEs) or a quantity of blind decodes to be performed for the carrier (block 510). For example, the UE (e.g., using antenna 252, DEMOD 254, MIMO detector 256, receive processor 258, controller/processor 280, and/or the like) may identify a span configuration conflict between two or more span configurations associated with a span pattern for a carrier, as described above. In some aspects, the two or more span configurations are associated with respective per-span capabilities for at least one of a quantity of non-overlapped CCEs or a quantity of blind decodes to be performed for the carrier.

As further shown in FIG. 5, in some aspects, process 500 may include selecting a span configuration or a per-span capability from the two or more span configurations to be used for the span pattern (block 520). For example, the UE (e.g., using antenna 252, DEMOD 254, MIMO detector 256, receive processor 258, controller/processor 280, and/or the like) may select a span configuration or a per-span capability from the two or more span configurations to be used for the span pattern, as described above.

As further shown in FIG. 5, in some aspects, process 500 may include receiving a communication on the carrier in accordance with the selected span configuration or the selected per-span capability (block 530). For example, the UE (e.g., using antenna 252, DEMOD 254, MIMO detector 256, receive processor 258, controller/processor 280, and/or the like) may receive a communication on the carrier in accordance with the selected span configuration or the selected per-span capability, as described above.

Process 500 may include additional aspects, such as any single aspect or any combination of aspects described below and/or in connection with one or more other processes described elsewhere herein.

In a first aspect, selecting the span configuration or the per-span capability is based at least in part on a UE type of the UE.

In a second aspect, alone or in combination with the first aspect, the selected per-span capability is a smallest per-span capability of the respective per-span capabilities.

In a third aspect, alone or in combination with one or more of the first and second aspects, process 500 includes providing an indication of a capability for selecting the selected span configuration or the selected per-span capability.

In a fourth aspect, alone or in combination with one or more of the first through third aspects, selecting the span configuration or the per-span capability is performed in accordance with the capability.

In a fifth aspect, alone or in combination with one or more of the first through fourth aspects, the capability indicates whether to select a largest per-span capability or a smallest per span capability as the selected per-span capability.

In a sixth aspect, alone or in combination with one or more of the first through fifth aspects, process 500 includes receiving information indicating a rule for selecting the span configuration or the per-span capability, wherein selecting the span configuration is based at least in part on the rule.

In a seventh aspect, alone or in combination with one or more of the first through sixth aspects, the rule indicates to select a largest span configuration of the two or more span capabilities or to select a largest per-span capability of the respective per-span capabilities.

In an eighth aspect, alone or in combination with one or more of the first through seventh aspects, the rule indicates to select a smallest span configuration or per-span capability of the two or more span configurations or the respective per-span capabilities.

In a ninth aspect, alone or in combination with one or more of the first through eighth aspects, the rule identifies the span configuration to be selected.

In a tenth aspect, alone or in combination with one or more of the first through ninth aspects, the information indicating the rule is received via semi-static signaling.

In an eleventh aspect, alone or in combination with one or more of the first through tenth aspects, the information indicating the rule is received via dynamic signaling.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of aspects of the present disclosure:

Aspect 1: A method of wireless communication performed by a user equipment (UE), comprising: identifying a span configuration conflict between two or more span configurations associated with a span pattern for a carrier, wherein the two or more span configurations are associated with respective per-span capabilities for at least one of a quantity of non-overlapped control channel elements (CCEs) or a quantity of blind decodes to be performed for the carrier; selecting a span configuration or a per-span capability from the two or more span configurations to be used for the span pattern; and receiving a communication on the carrier in accordance with the selected span configuration or the selected per-span capability.

Aspect 2: The method of aspect 1, wherein selecting the span configuration or the per-span capability is based at least in part on a UE type of the UE.

Aspect 3: The method of one or more of the previous aspects, wherein the selected per-span capability is a smallest per-span capability of the respective per-span capabilities.

Aspect 4: The method of one or more of the previous aspects, further comprising: providing an indication of a capability for selecting the selected span configuration or the selected per-span capability.

Aspect 5: The method of aspect 4, wherein selecting the span configuration or the per-span capability is performed in accordance with the capability.

Aspect 6: The method of aspect 4, wherein the capability indicates whether to select a largest per-span capability or a smallest per span capability as the selected per-span capability.

Aspect 7: The method of one or more of the previous aspects, further comprising: receiving information indicating a rule for selecting the span configuration or the per-span capability, wherein selecting the span configuration is based at least in part on the rule.

Aspect 8: The method of aspect 7, wherein the rule indicates to select a largest span configuration of the two or more span capabilities or to select a largest per-span capability of the respective per-span capabilities.

Aspect 9: The method of aspect 7, wherein the rule indicates to select a smallest span configuration or per-span capability of the two or more span configurations or the respective per-span capabilities.

Aspect 10: The method of aspect 7, wherein the rule identifies the span configuration to be selected.

Aspect 11: The method of aspect 7, wherein the information indicating the rule is received via semi-static signaling.

Aspect 12: The method of aspect 7, wherein the information indicating the rule is received via dynamic signaling.

Aspect 13: An apparatus for wireless communication at a device, comprising a processor; memory coupled with the processor; and instructions stored in the memory and executable by the processor to cause the apparatus to perform the method of one or more aspects of aspects 1-12.

Aspect 14: A device for wireless communication, comprising a memory and one or more processors coupled to the memory, the memory and the one or more processors configured to perform the method of one or more aspects of aspects 1-12.

Aspect 15: An apparatus for wireless communication, comprising at least one means for performing the method of one or more aspects of aspects 1-12.

Aspect 16: A non-transitory computer-readable medium storing code for wireless communication, the code comprising instructions executable by a processor to perform the method of one or more aspects of aspects 1-12.

Aspect 17: A non-transitory computer-readable medium storing a set of instructions for wireless communication, the set of instructions comprising one or more instructions that, when executed by one or more processors of a device, cause the device to perform the method of one or more aspects of aspects 1-12.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    identifying a span configuration conflict between two or more span configurations associated with a span pattern for a carrier, wherein the two or more span configurations are associated with respective per-span capabilities for at least one of a quantity of non-overlapped control channel elements (CCEs) or a quantity of blind decodes to be performed for the carrier;
    receiving information indicating a rule for selecting the span configuration or the per-span capability;
    selecting, based at least in part on the rule, a span configuration or a per-span capability from the two or more span configurations to be used for the span pattern; and
    receiving a communication on the carrier in accordance with the selected span configuration or the selected per-span capability.

2. The method of claim 1, wherein selecting the span configuration or the per-span capability is based at least in part on a UE type of the UE.

3. The method of claim 1, wherein the selected per-span capability is a smallest per-span capability of the respective per-span capabilities.

4. The method of claim 1, further comprising:
providing an indication of a capability for selecting the selected span configuration or the selected per-span capability.

5. The method of claim 4, wherein selecting the span configuration or the per-span capability is performed in accordance with the capability.

6. The method of claim 4, wherein the capability indicates whether to select a largest per-span capability or a smallest per span capability as the selected per-span capability.

7. The method of claim 1, wherein the rule indicates to select a largest span configuration of the two or more span capabilities configurations or to select a largest per-span capability of the respective per-span capabilities.

8. The method of claim 1, wherein the rule indicates to select a smallest span configuration or per-span capability of the two or more span configurations or the respective per-span capabilities.

9. The method of claim 1, wherein the rule identifies the span configuration to be selected.

10. The method of claim 1, wherein the information indicating the rule is received via semi-static signaling.

11. The method of claim 1, wherein the information indicating the rule is received via dynamic signaling.

12. A user equipment (UE) for wireless communication, comprising:
a memory; and
one or more processors operatively coupled to the memory, the memory and the one or more processors configured to:
identify a span configuration conflict between two or more span configurations associated with a span pattern for a carrier, wherein the two or more span configurations are associated with respective per-span capabilities for at least one of a quantity of non-overlapped control channel elements (CCEs) or a quantity of blind decodes to be performed for the carrier;
receive information indicating a rule for selecting the span configuration or the per-span capability;
select, based at least in part on the rule, a span configuration or a per-span capability from the two or more span configurations to be used for the span pattern; and
receive a communication on the carrier in accordance with the selected span configuration or the selected per-span capability.

13. The UE of claim 12, wherein selecting the span configuration or the per-span capability is based at least in part on a UE type of the UE.

14. The UE of claim 12, wherein the selected per-span capability is a smallest per-span capability of the respective per-span capabilities.

15. The UE of claim 12, wherein the one or more processors are further configured to:
provide an indication of a capability for selecting the selected span configuration or the selected per-span capability.

16. The UE of claim 15, wherein selecting the span configuration or the per-span capability is performed in accordance with the capability.

17. The UE of claim 15, wherein the capability indicates whether to select a largest per-span capability or a smallest per span capability as the selected per-span capability.

18. The UE of claim 12, wherein the rule indicates to select a largest span configuration of the two or more span configurations or to select a largest per-span capability of the respective per-span capabilities.

19. The UE of claim 12, wherein the rule indicates to select a smallest span configuration or per-span capability of the two or more span configurations or the respective per-span capabilities.

20. The UE of claim 12, wherein the rule identifies the span configuration to be selected.

21. The UE of claim 12, wherein the information indicating the rule is received via semi-static signaling.

22. The UE of claim 12, wherein the information indicating the rule is received via dynamic signaling.

23. A non-transitory computer-readable medium storing a set of instructions for wireless communication, the set of instructions comprising:
one or more instructions that, when executed by one or more processors of a user equipment (UE), cause the UE to:
identify a span configuration conflict between two or more span configurations associated with a span pattern for a carrier, wherein the two or more span configurations are associated with respective per-span capabilities for at least one of a quantity of non-overlapped control channel elements (CCEs) or a quantity of blind decodes to be performed for the carrier;
receive information indicating a rule for selecting the span configuration or the per-span capability;
select, based at least in part on the rule, a span configuration or a per-span capability from the two or more span configurations to be used for the span pattern; and
receive a communication on the carrier in accordance with the selected span configuration or the selected per-span capability.

24. The non-transitory computer-readable medium of claim 23, wherein selecting the span configuration or the per-span capability is based at least in part on a UE type of the UE.

25. The non-transitory computer-readable medium of claim 23, wherein the selected per-span capability is a smallest per-span capability of the respective per-span capabilities.

26. The non-transitory computer-readable medium of claim 23, wherein the one or more instructions further cause the UE to:
provide an indication of a capability for selecting the selected span configuration or the selected per-span capability.

27. An apparatus for wireless communication, comprising:
means for identifying a span configuration conflict between two or more span configurations associated with a span pattern for a carrier, wherein the two or more span configurations are associated with respective per-span capabilities for at least one of a quantity of non-overlapped control channel elements (CCEs) or a quantity of blind decodes to be performed for the carrier;
means for receiving information indicating a rule for selecting the span configuration or the per-span capability;

means for selecting, based at least in part on the rule, a span configuration or a per-span capability from the two or more span configurations to be used for the span pattern; and means for receiving a communication on the carrier in accordance with the selected span configuration or the selected per-span capability.

28. The apparatus of claim 27, wherein selecting the span configuration or the per-span capability is based at least in part on a UE type of the UE.

29. The method of claim 2, wherein the UE type of the UE comprises a low-tier UE type or a low-power UE type.

30. The UE of claim 13, wherein the UE type of the UE comprises a low-tier UE type or a low-power UE type.

* * * * *